United States Patent [19]
Sutton, Jr.

[11] Patent Number: 5,968,118
[45] Date of Patent: *Oct. 19, 1999

[54] INFORMATION OUTLET AND INDUSTRIAL SET TOP FUNCTIONALITY

[75] Inventor: Garnett Graham Sutton, Jr., Graham, N.C.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/693,627

[22] Filed: Aug. 8, 1996

[51] Int. Cl.⁶ .............................. H04H 1/02; H04N 7/14

[52] U.S. Cl. .............................. 709/217; 348/8; 348/10; 348/12; 348/14; 455/4.2; 455/5.1; 455/6.2; 455/6.3

[58] Field of Search .............................. 348/6, 7, 12, 13, 348/8, 10, 11, 14; 455/6.1, 4.2, 5.1, 3.1, 4.1, 6.2, 6.3; 709/217, 219; H04N 7/10, 7/14, 7/173

[56] References Cited

U.S. PATENT DOCUMENTS

| | | | |
|---|---|---|---|
| 4,077,006 | 2/1978 | Nicholson | 348/86 |
| 4,901,367 | 2/1990 | Nicholson | 455/4.2 |
| 5,343,240 | 8/1994 | Yu | 348/14 |
| 5,512,937 | 4/1996 | Beierle | 348/14 |
| 5,592,477 | 1/1997 | Farris et al. | 348/7 |
| 5,610,916 | 3/1997 | Kostreski et al. | 348/7 X |
| 5,642,155 | 6/1997 | Cheng | 348/12 |
| 5,729,824 | 3/1998 | O'Neill et al. | 455/3.1 |
| 5,764,734 | 6/1998 | Medendorp et al. | 455/6.3 X |
| 5,812,928 | 9/1998 | Watson, Jr. et al. | 455/5.1 |
| 5,842,111 | 11/1998 | Byers | 455/6.3 |

*Primary Examiner*—John W. Miller

[57] ABSTRACT

The invention provides a central location for receiving voice, video, and data signals. A plurality of user locations are connected to a single central location. Each user location is connected to the central location by means of a single coax wire, and voice, video and data are all multiplexed over the coax, so that increased data capabilities can be added to individual user locations without the need to rewire existing user locations. This is particularly advantageous where such user locations have already been wired, and where rewiring would be a difficult and expensive process, e.g., passenger cabins on board a cruise ship.

1 Claim, 2 Drawing Sheets

INFORMATION OUTLET AND INDUSTRIAL SET TOP FUNCTIONALITY

BACKGROUND OF THE INVENTION

The present invention relates to an information outlet which integrates voice, data, and video information. In particular, the invention relates to cable television delivery systems, customer premise telephone switching systems, and Ethernet local area networks ("LANs") in which voice, data, and video can be integrated.

Generally, CATV has been used primarily for distribution of video to private subscribers, and to the hotel/motel industry. Distribution of video to these subscribers involves the use of a device called a "Set-Top Box", which generally refers to a device which receives a number of analog or digital television channels, and then decodes or descrambles those channels which have been subscribed to, and presents them on a standard television set, typically on VHF channel 3 or 4. A schematic diagram of a typical system is shown in FIG. 1.

Although the Set-Top Box worked adequately for the residential market when it was first introduced, the interactive television market and consumer response to the Internet and to other data applications has virtually every Set-Top Box manufacturer scrambling to capture the residential market with an innovative product. As the volume of Set-Top Boxes sold is so huge, the industrial customer has been virtually ignored.

Bandwidth, connectivity, and functionality are the features required by the industrial customer. There are a number of variations of the needs of industrial customers which can be solved in the same manner. The bandwidth need involves the considerable bandwidth required for the CATV stations combined with the future unknown data rates to the desktop that could include ATM rates. The problem is that in some cases the coaxial wire cabling ("coax") has already been pulled, and in other cases the cost of fiber optic cabling is prohibitive.

Connectivity involves a means by which all of the desktop services can be provided to the industrial consumer via one integrated solution without a number of cumbersome devices that require space and can be the victim of theft. Unfortunately, no such device is currently available to fulfill these needs.

The functionality need involves the ability to control the selection of CATV channels by a variety of means, rather than the traditional infrared ("IR") remote control unit. This need cannot preclude the use of an IR remote control, but merely means that additional, parallel means by which selections can be made via other data connections, should also be provided, as the video selections will not always be conventional programming, but, rather, whatever the consumer decides to connect to the cable head end. The problem, here, is that no currently available devices allow a user access from a network server or from other devices that can be manipulated under program control.

SUMMARY OF THE INVENTION

In accordance with the preferred embodiment of the invention, the problem has been solved by first moving the functionality of the Set-Top Box to the wiring closet. This move has the effect of taking an almost full piece of coax with more than 42 analog or digital video channels and requiring only the video channel which is being viewed (i.e., typically VHF channel 3 or 4) to be loaded onto the cable going to the desktop. This modification provides the bandwidth needed to easily provide 100 megabit Ethernet service, and, possibly, ATM data rates.

In order to accomplish the foregoing result, an IR detector is needed at the desktop. The IR detector can receive IR signaling and then convert that IR signaling into a bit stream. In addition to the IR detector, an IR repeater would add functionality and would essentially be the opposite of the IR detector. In other words, the repeater would receive a bit stream and then convert that bit stream into IR signaling. These devices, as well as asynchronous ports would have their data streams modulated within the frequency range normally associated with VHF channel 13.

An Ethernet tap would also ride on the coax on UHF channels 20–32 and would be switch selectable between 10 megabits and 100 megabits per second rates. This would reserve the bandwidth in advance for 100 megabit Ethernet, but would provide current compatibility for 10 megabit Ethernet users.

As mentioned above, downstream video would preferably be on either VHF channel 3 or 4 only, but for future use channels 2–10 would be reserved for downstream video. Upstream video would require three channels, and they are allocated to UHF channels 14–16.

Thus, in accordance with the present invention, the conventional Set-Top Box would be eliminated at the desktop. Instead, there is an IR detector, an IR repeater, two or more asynchronous ports, 100 megabit Ethernet tap, three upstream video taps, and one (multichannel) downstream video tap, all on the same piece of coax. What is required to accomplish this task is described as a collection of modems. The modems will reuse the frequency spectrum normally associated with VHF and UHF on CATV channels, but they will do it on private coax. Of course, one of the main reasons for using these frequency spectrums is the considerable history of using this same coax for transmitting all of the channels on a typical CATV implementation.

DETAILED DESCRIPTION OF THE PREFERRED EMBODIMENT OF THE INVENTION

Figure 1:
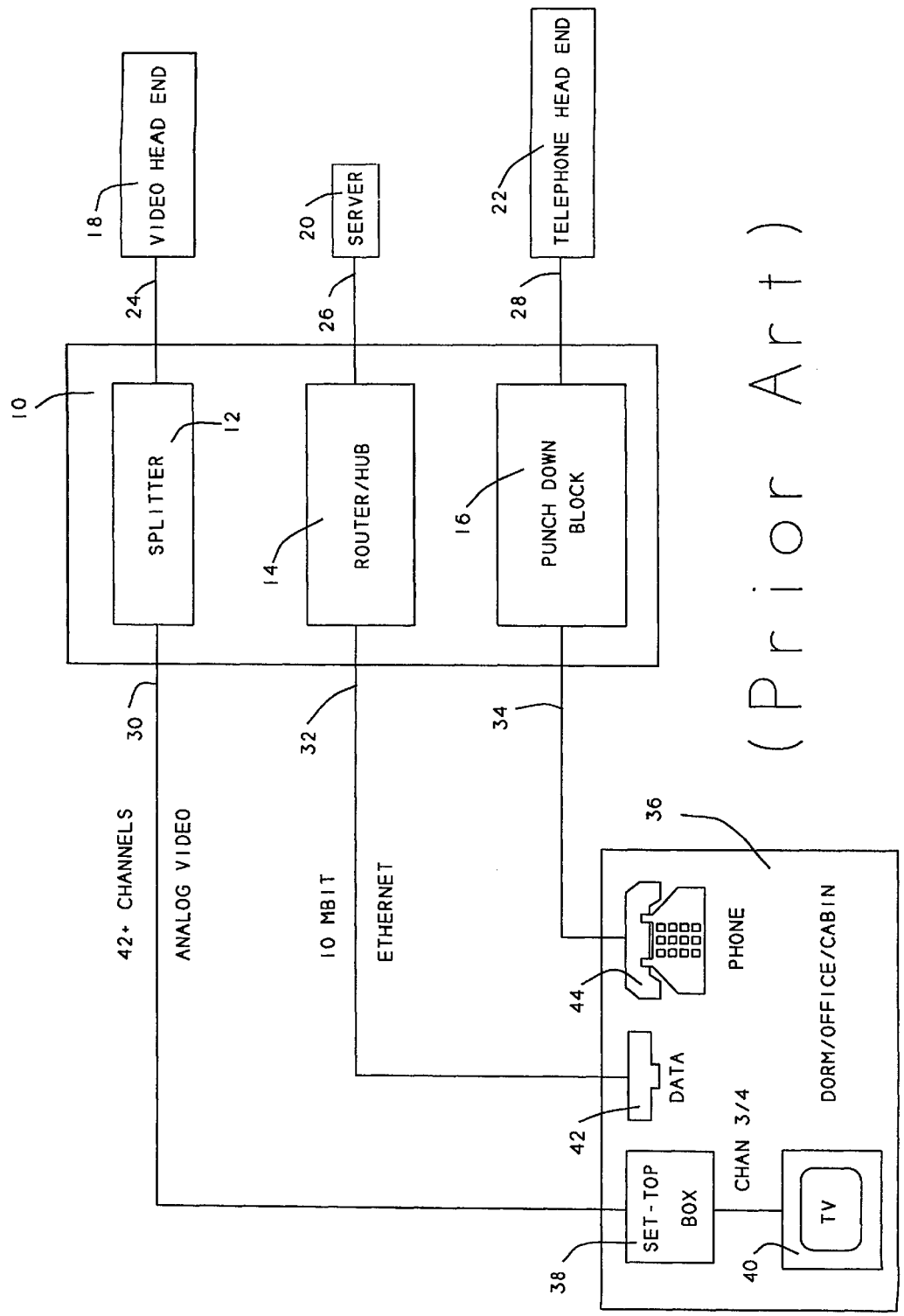
FIG. 1 illustrates a schematic diagram of a typical system of the type used in the prior art.

In order to understand the present invention, it is helpful to first review the systems of the prior art. With reference, therefor, to FIG. 1, the system of the prior is shown. In the prior art system, a wiring closet 10 typically houses a splitter 12, a router/hub 14, and a punch down block 16. As illustrated, the splitter 12 is connected to a Video Head End 18 by a cable 24, the router/hub 14 is connected to a server 20 by a cable 26, and the punch down block 16 is connected to a Telephone Head End 22 by a cable 28.

In an industrial application, the output from the splitter 12 is typically a coax cable 30 which carries video signals to a set top box 38 which is located in a user's location, which may be a dorm room, an office, or a shipboard cabin 36. Similarly, the output from the router/hub 14 is typically an Ethernet, or similar, cable 32 which runs to a data port 42 in the user's location 36. Finally, the output of the punch down block 16 is run to a telephone 44 in the user's location 36. As will be understood by those skilled in the art, the jacks which may be present in the user's location 36 are not shown in order to simplify the illustration.

The set-top box 38 is typically connected to a standard TV receiver by a coax cable which typically carries video information which has been modulated on VHF channel 3 or VHF channel 4.

Figure 2:
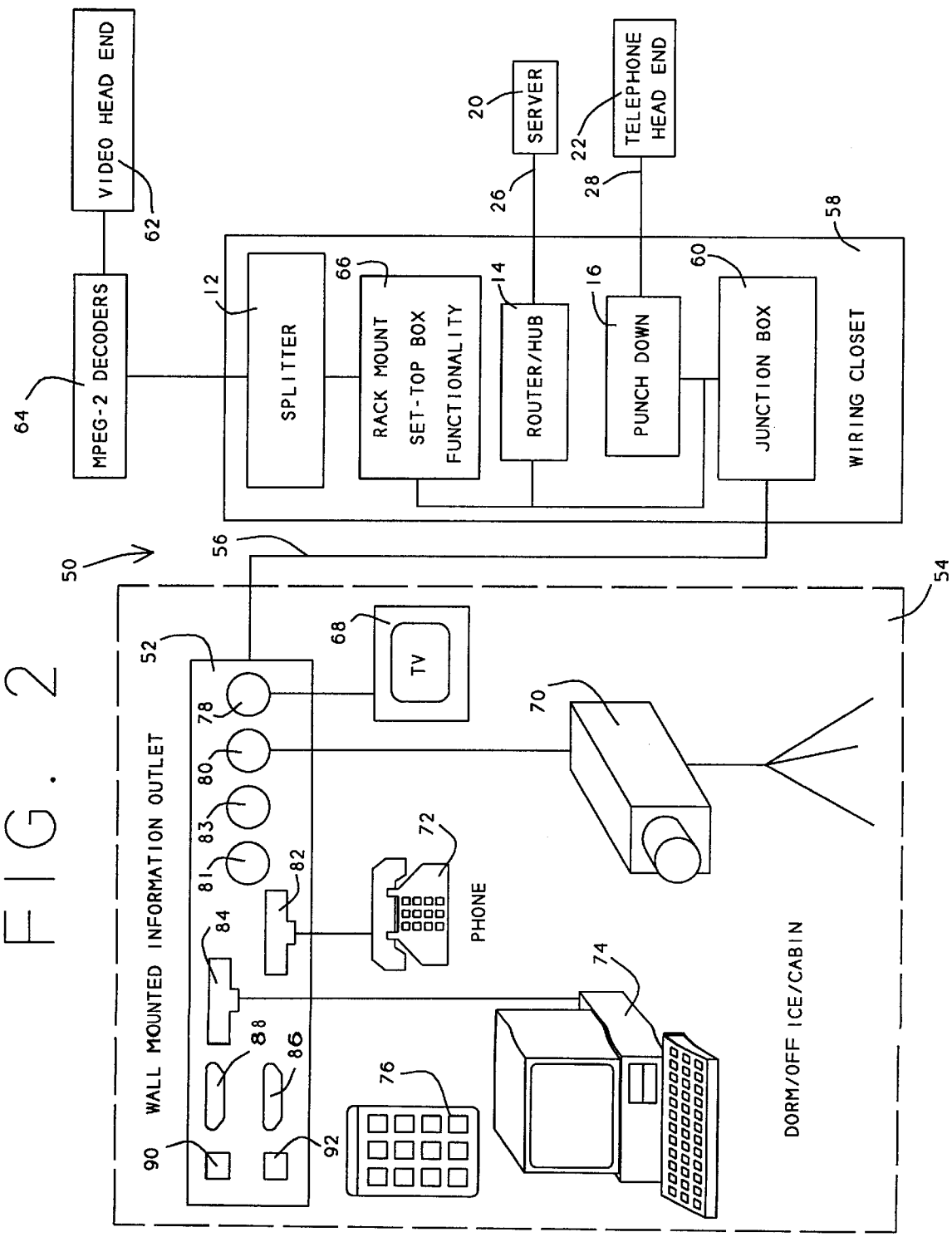
FIG. 2 illustrates the system in accordance with the present invention.

Referring now to FIG. 2, the present invention is a system 50 which includes a wall mounted information outlet 52 which is located in a user's location 54 (typically, a dorm room, an office, or a shipboard cabin), and which is connected by a single coax wire 56 to a junction box 60 in a wiring closet 58.

The information outlet 52 contains the electronics needed for several modulators and demodulators, so it requires some type of external power connection (not shown). In accordance with the invention, the information outlet 52 is a wall mount design, although those skilled in the art will recognize that a wall mount is not strictly required. Its use is preferred, as it results in a substantially theft-proof design which has no horizontal footprint.

As illustrated in FIG. 2, in accordance with the present invention, the information outlet 52 is connected, by means of a coax cable 56, to a junction box 60 which is in a wiring closet 58. The junction box 60 contains appropriate modulator means and demodulator means for communicating over the coax wire 56 with complementary demodulator and modulator means in the information outlet 52. As illustrated, the junction box 60 receives signals from a Video Head End 62, which is preferably able to send compressed video signals through a decompression unit, such as MPEG-2 decoders 64. Also, within the wiring closet, there is a means 66 for providing the set-top box functionality which was formerly in the set-top box 38 of the prior art. As this set-top box functionality is provided, in accordance with the present invention, in the wiring closet 58, in the preferred embodiment of the invention the means for providing such functionality 66 is preferably provided as a rack mounted unit. Of course, those skilled in the art will recognize that a rack mounted device is not needed to accomplish the present invention, and such mounting is preferred herein, as rack mounted units are generally used in industrial settings.

The coax wire 56 is used to multiplex all of the signals which are required by the user in the location 54, which is typically a dorm room, an office, or a shipboard cabin. The signals which are sent over the coax cable 56 include video signals for a video monitor or a conventional TV receiver 68, and video signals which may originate in the user's location 54, from a video input device, such as a laser disc, a video cassette recorder, or a video camera 70. Other signals which may be sent bidirectionally, between the information outlet 52 and the junction box 60, include telephone signals from a telephone 72 or telephone head end 22, data signals from a computer or terminal device 74 or server 20, and infrared signals from a remote control unit 76.

The various signals referred to above, are handled by the information outlet 52 by means of a variety of connectors and ports on the information outlet 56. These include a downstream video connector 78, upstream video connectors 80, 81, 83, a telephone jack 72, a data port 84, serial data connectors 86, 88, and infrared ports 90, 92.

As will be understood by those skilled in the art, a particular advantage of the present invention is that it moves all of the prior functionality of the set-top box 38 away from the user's location, and into a common wiring closet 58, freeing up bandwidth in the coax cable 56. In an industrial setting, this means that the equipment is readily accessible by service personnel, and it means that the functionality, of the prior devices is retained, but the need for many cables, e.g., the three cables 30, 32, 34 (of FIG. 1), i.e., one for each of the supported devices is now replaced by the single coax cable 56 which corresponds to the cable 30 of FIG. 1. This latter advantage means that in those instances in which a large number of user locations had been prewired, e.g., the cabins on a cruise ship, additional functionality can be provided to the individual cabins without having to rewire an entire ship, as the coax cable 30 which was already present can be used as coax cable 56.

At the same time, the prior set-top box functionality can be retained by using the infrared ports 90, 92, together with the infrared remote controller 76 in the same manner as was common in the prior art. In order to accomplish that result, the coax wire 56 must carry signals in both directions between the information outlet 52 and the junction box 60. The various VHF and UHF channel information which was carried by the coax wire 30 in a single direction in the prior art (See FIG. 1), is now available for carrying multiplexed data, including encoded signals from the infrared remote control 76, between the wiring closet 58 and the user's location 54.

As will be understood by those skilled in the art, the functionality of the junction box 60 and industrial set-top box 66 can be combined into a single device which performs all of the required functions and eliminates several interfaces, and the previous functionality of the set-top box 38 (FIG. 1) does not have to change when that functionality is moved to a device 66 in the wiring closet 58. Accordingly, it is possible, and within the scope of the present invention, to modify the currently popular set-top boxes 38 to have them remotely mounted in a wiring closet 58, and have all of the functions of the prior art set-top boxes 38 performed by the modified device in the wiring closet 58 which receives data in the form of a bit stream transmitted by the information outlet 52, after the IR detector in the information outlet 52 has received the data from the IR remote 76, modulated the data, and sent it to the junction box 60 over the coax 56. The demodulators in the junction box 60, will then demodulate the received bit stream and send the bit stream to the modified, remotely mounted set-top box 66, which will then modify the downstream video selection which is sent to the user's location 54 over the coax 56.

Those skilled in the art will, of course, recognize that the other functions, provided by the router/hub 14, server 20, punch down 16, and telephone head end 22 of the prior art (FIG. 1), are retained in the present invention (FIG. 2), wherein like elements have like numbers.

The information outlet 52 also includes serial ports 86, 88 which can be used in addition to, or in lieu of, the IR detectors 90, 92, and the IR remote 76. Accordingly, a personal computer 74 could be used to control the video being received at the user's location 54.

An alternative implementation of the present invention would be a rack-mounted set-top device having an IR repeater mounted over the IR detector of the set-top box 38 of the prior art. Thus, the remotely mounted set-top box 66 would receive the bit stream over the coax 56 which originated from the IR remote 76, even though it would be mounted in a rack in the wiring closet 58.

Even greater savings can be achieved by moving video decoders, such as an MPEG-2 decoder 64 which are present in some set-top boxes from the set-top box 38 closer to the video head end 62. In accordance with the present invention, there is plenty of bandwidth available from the video head end 62 to the wiring closet 58, and it is better to do MPEG-2 decoding once for each channel, rather than once for each of 30,000 monitors.

In accordance with the invention, the information outlet 52, together with the counterpart electronics in the wiring closet 58, is able to take the place of the set-top box 38 of the prior art. In addition, the present invention provides an integrated voice, data, and video information outlet which has at least one infrared detector to accommodate the use of an IR remote control 76. The use of an IR repeater within the information outlet 52 will accommodate IR signaling from the user's location 54 to the wiring closet 58. The provision of several asynchronous ports 86, 88 will enable miscellaneous low speed connections, while a switch selectable 10 megabit or 100 megabit Ethernet connection will provide the needed communications capacity over the existing coax 56.

A number of upstream video connections, such as connection 80 provide support for video cameras, VCRs, and other composite video signals for broadcasts originating from a user's location 54, while at least one downstream video port 78 provides for connection to a television set or a video monitor.

As described above, standard modulation electronics within the information outlet 52 can be used to combine all of the signals on the existing coax 56, so that no rewiring is required to add the functionality of the invention to an existing location 54. The electronics in the wiring closet 58, including the junction box 60 provides for the splitting of the signals off the coax 56 for connection to hubs, PBXs, and to provide set-top functionality. As set forth above, the set-top box functionality in the wiring closet 58 can be switched by a remote control unit 76 at the user's location 54 by using an infrared repeater, or through a data stream received on one of the 9-pin serial ports 86, 88. As will be understood by those skilled in the art, the functionality of the present invention does not have to change if fiber optic cable is substituted for the coax 56. Only the electronics associated with modulation/demodulation would need to be changed with fiber optic substitution.

I claim:

1. A system for delivering multiple communication services to at least one user location comprising:

a video monitor disposed at the user location, the video monitor receptive to at least one VHF channel;

an information outlet disposed at the user location and having a plurality of output ports, the information outlet adapted to receive communication signals from a remote location and to distribute the signals according to a service type to respective ones of the output ports, the plurality of ports including a video port, a voice port, and a data port;

a transmissive connection from the video output port to the video monitor;

precisely one cable extending between the remote location to the information outlet, the cable serving only one user location;

a selection device disposed at the remote location, the selection device being remotely operable from the user location for selecting a video signal from precisely one of a plurality of incoming video channels, modulating the video signal on a VHF channel, and sending the modulated signal, via the cable, to the information outlet;

a voice device disposed at the remote location, the voice device configured to receive external voice signals and place them on the one cable for transmission to the information outlet; and a data device disposed at the remote location, the data device configured to receive external data signals and place them on the cable for transmission to the information outlet;

wherein the video signals, external voice signals, and external data signals collectively occupy a plurality of UHF and VHF channels on the one cable.

* * * * *